United States Patent [19]

Arnott et al.

[11] 3,972,586
[45] Aug. 3, 1976

[54] ROADWAY MARKER AND REFLECTOR THEREFOR

[75] Inventors: Robin A. Arnott; John F. Domaracki, both of Windsor, Canada

[73] Assignee: International Tools (1973) Ltd., Windsor, Canada

[22] Filed: Aug. 19, 1974

[21] Appl. No.: 498,343

[52] U.S. Cl. .................................. 350/106; 350/100
[51] Int. Cl.² ............................................ G02B 5/13
[58] Field of Search ................... 350/106, 103, 104; 404/12

[56] References Cited
UNITED STATES PATENTS

| | | | |
|---|---|---|---|
| 1,706,218 | 3/1929 | Chretien | 350/106 |
| 2,151,279 | 3/1939 | Pascucci | 350/106 |
| 2,555,191 | 5/1951 | Haggart, Jr. | 350/106 |
| 2,951,419 | 9/1960 | Lemelson | 350/106 |
| 3,449,158 | 6/1969 | Rowland | 350/167 X |
| 3,741,623 | 6/1973 | Mihalik | 350/103 |
| 3,758,191 | 9/1973 | Hedgewick | 350/103 |

FOREIGN PATENTS OR APPLICATIONS

| | | | |
|---|---|---|---|
| 962,477 | 12/1949 | France | 350/106 |
| 438,328 | 4/1935 | United Kingdom | 350/106 |

Primary Examiner—John K. Corbin
Assistant Examiner—B. Wm. de los Reyes
Attorney, Agent, or Firm—Reising, Ethington, Barnard, Perry & Brooks

[57] ABSTRACT

A roadway marker having a housing with a base for engagement with the surface of a roadway, and a reflective wall for reflecting light from vehicles on the roadway. The reflective wall has a central plane extending at an acute angle from the base and is integrally formed with a plurality of spherical reflector elements arranged in side by side relationship. Each of the spherical reflector elements has its center located on the central plane with the portions of the spherical reflector elements that project from one side of the central plane defining an outer, light receiving surface and the portions of the spherical reflector elements that project from the other side of the central plane defining an inner, light reflecting surface of the reflective wall. The reflective wall may be formed by a separate reflector that is mounted in the housing as an insert. Also disclosed is a method of making such structures which includes the steps of assembling a plurality of pins having semi-spherical ends into a pin bundle, forming an electroform having a mold surface with semi-spherical depressions complementary to the semi-spherical ends of the pin bundle, and disposing a pair of such electroforms in molding apparatus with the mold surfaces in opposed relationship to define a cavity therebetween. The cavity is filled with light transmitting synthetic resin to form the reflector.

9 Claims, 11 Drawing Figures

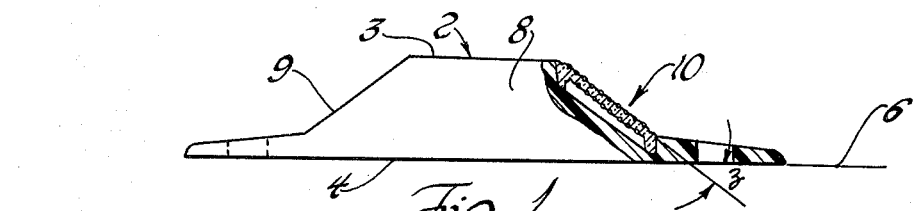
Fig. 1
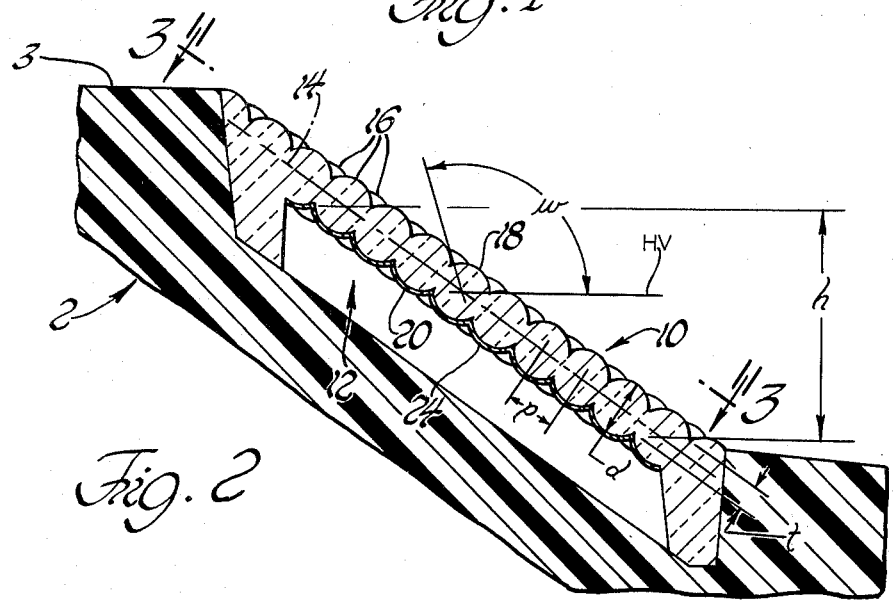
Fig. 2
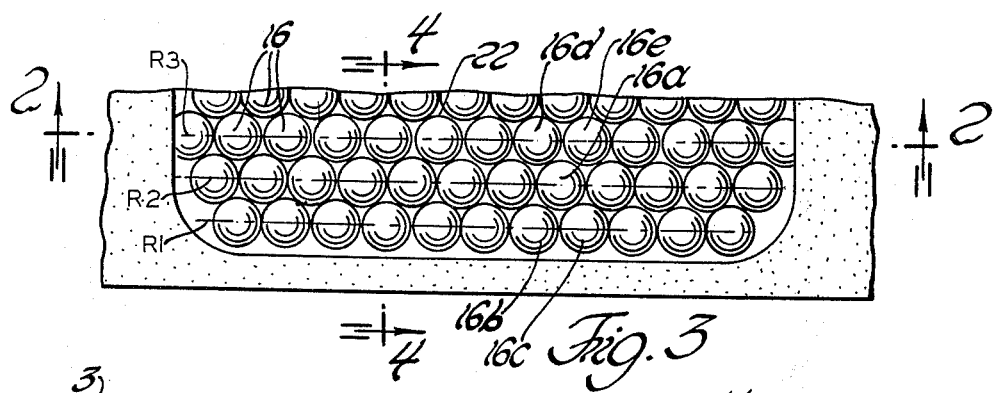
Fig. 3
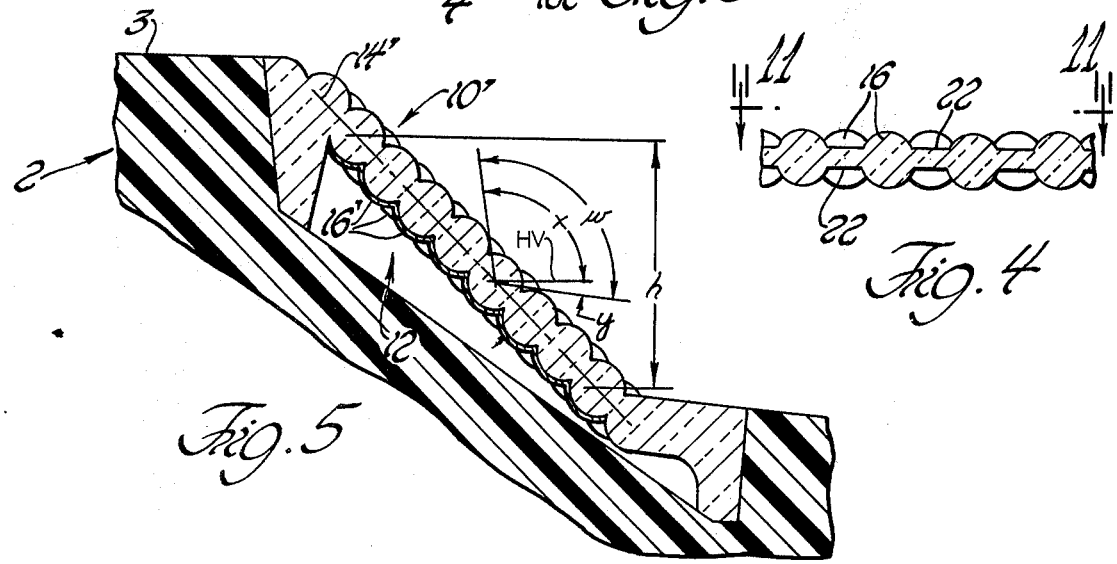
Fig. 4
Fig. 5

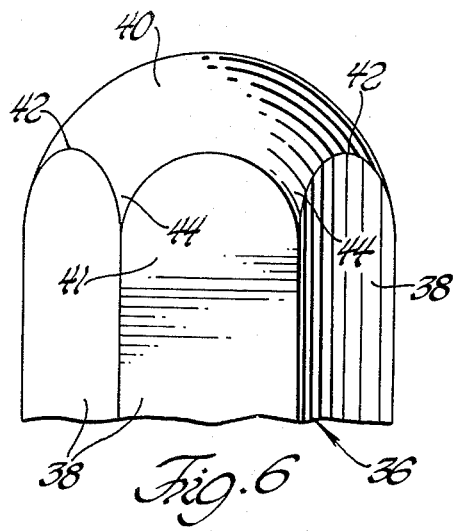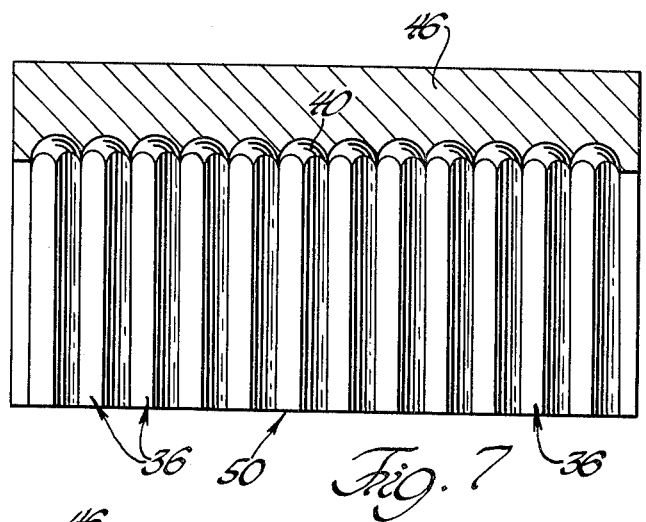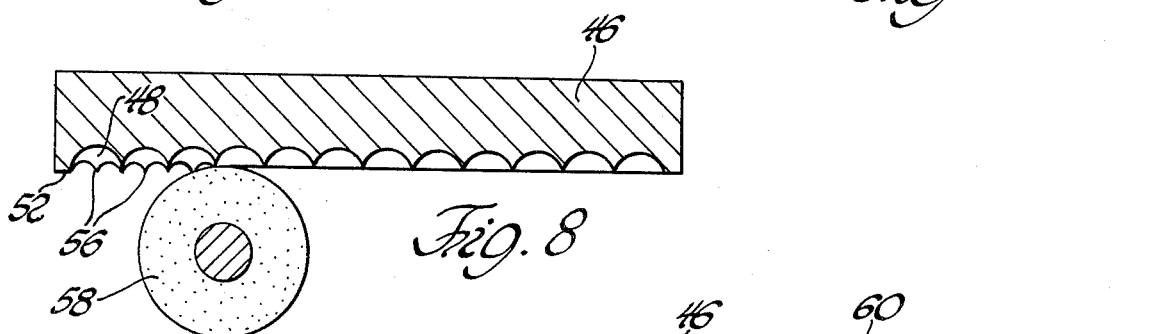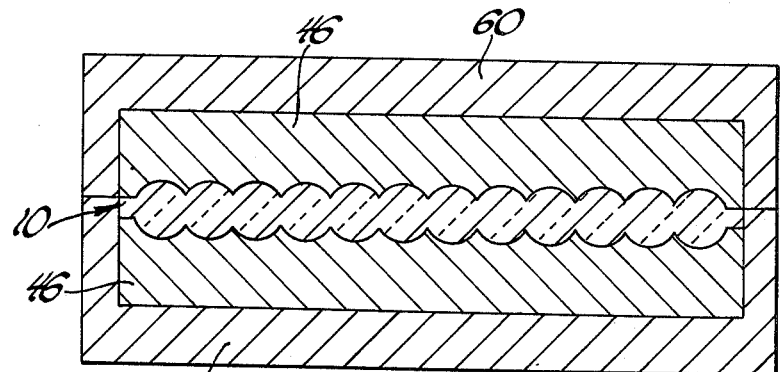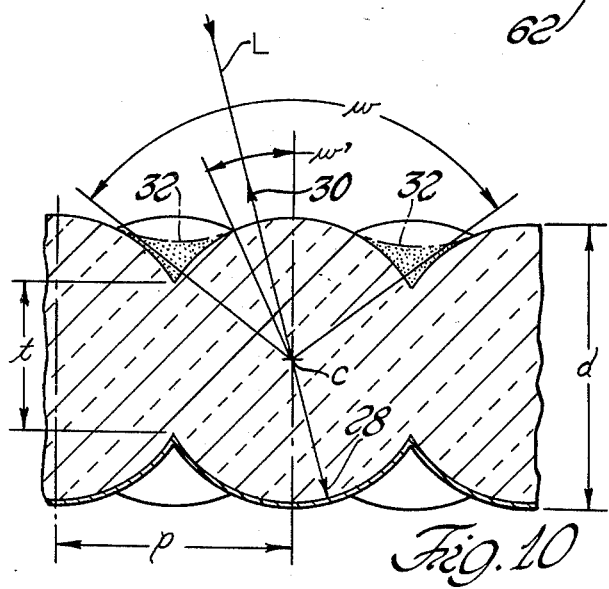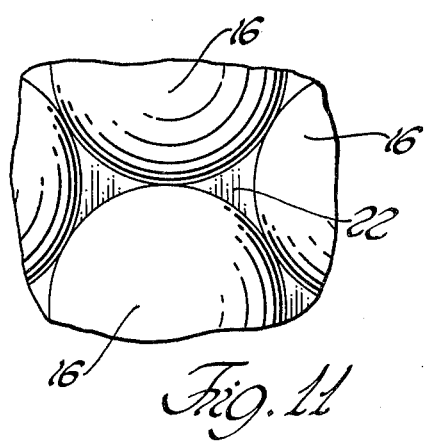

ROADWAY MARKER AND REFLECTOR THEREFOR

BACKGROUND OF THE INVENTION

1. Field of the Invention

This invention relates generally to roadway markers, and is particularly concerned with roadway markers utilizing retro directive reflecting elements and to reflectors suitable for use with such roadway markers.

2. Description of the Prior Art

Roadway markers using reflectors having retro directive reflector elements have come into widespread use to dilineate traffic lanes and the edges of roadways. Such roadway markers are superior to painted strips on the roadways since under poor weather conditions, the painted strips on the roadways are not visible.

The most common type of reflector utilized in such roadway markers are those formed with cube corner reflex reflector elements. In the manufacture of reflectors having cube corner reflex reflector elements, it is common to form a die from a plurality of pins having the cube corner surfaces machined onto the ends of the pins. This is an expensive operation since a very high degree of accuracy is required. Furthermore, the reflective efficiency of cube corner reflex reflector elements decreases as the entrance angle of the light to be reflected increases with respect to the normal to the reflector surface.

Examples of prior art pavement markers, reflectors, and manufacturing methods and apparatus are disclosed in U.S. Pat. Nos. 1,906,655; 2,056,491; 2,120,524; 2,330,096; 2,360,480; 2,538,638; 2,951,419; 3,258,840; 3,332,327; 3,417,959; 3,758,191; 3,784,279 and 3,712,706.

SUMMARY OF THE INVENTION

An object of this invention is to provide a roadway marker and reflector therefor that can be manufactured with ease as compared with prior art devices.

A further object is to provide a roadway marker and reflector therefor having a high degree of uniformity of reflective performance for light striking the reflector over a wide angle.

A roadway marker in accordance with the present invention includes a housing having a base for engagement with the surface of a roadway and a reflective wall for reflecting light from vehicles on the roadway. The reflective wall has a central plane extending at an acute angle from the base and is integrally formed with a plurality of spherical reflector elements. The spherical reflector elements each has its center located on the central plane with the portions of the spherical reflector elements projecting from one side of the central plane defining the outer light receiving surface of the reflective wall, and the portions of the spherical reflector elements projecting from the other side of the central plane defining the inner light reflecting surface of the reflective wall.

The reflective wall may be made of a reflector comprising a body of light transmitting synthetic resin. The spherical reflector elements on the reflector body are arranged in side by side relationship and in rows with the reflector elements in each row staggered with respect to the reflector elements in any adjacent row. Any incident light ray striking a spherical reflector element along a radius will pass through the center of the reflector element and be reflected back in the same line as the incident light ray.

Reflectors according to the invention can be manufactured by utilizing pins formed with semi-spherical ends. The pins can be assembled into a pin bundle, and electroplated to form an electroform having a mold surface with semi-spherical depressions complementary to the semi-spherical ends of the pin bundle. A pair of such electroforms can be disposed in molding apparatus with the mold surfaces thereof in opposed relationship with a cavity formed between the opposed mold surfaces. The reflector is formed by filling the cavity with suitable light transmitting synthetic resin material.

BRIEF DESCRIPTION OF THE DRAWINGS

FIG. 1 is an elevational view, partially in section, of a roadway marker embodying the invention;

FIG. 2 is an enlarged sectional view taken approximately on lines 2—2 of FIG. 3 of the roadway marker of FIG. 1;

FIG. 3 is a view taken on lines 3—3 of FIG. 2;

FIG. 4 is a fragmentary sectional view taken on lines 4—4 of FIG. 3;

FIG. 5 is a view similar to FIG. 2 of a second form of roadway marker embodying the invention;

FIG. 6 is an enlarged view of a pin employed in the manufacture of the reflector embodying the invention;

FIGS. 7, 8 and 9 illustrate sequential steps in the manufacture of a reflector embodying the invention;

FIG. 10 is an enlarged, fragmentary sectional view of the reflector utilized with the roadway marker of FIGS. 2 and 3; and FIG. 11 is a view taken along lines 11—11 of FIG. 4.

DESCRIPTION OF THE PREFERRED EMBODIMENT

In FIG. 1, reference numeral 2 collectively designates a roadway marker housing having a top wall 3, base 4 secured to the surface 6 of a roadway, side walls 8 (only one being visible in the drawings), an end wall 9, and a reflector wall extending from the top wall 3 toward the base and defined by a reflector indicated collectively by reference numeral 10. The reflector 10 is seated in a recess 12 formed in the housing 2.

The reflector 10 has a central plane 14 extending at an acute angle with respect to the base 4, and is integrally formed with a plurality of spherical reflector elements 16 arranged in side by side relationship. The spherical reflector elements 16 each has its center located on the central plane 14, and the portions of the spherical reflector elements projecting from the right hand side of the central plane as viewed in FIGS. 1 and 2 define an outer, light receiving surface 18 of the reflective wall, while the portions of the spherical reflector elements projecting from the left hand side of the central plane 14 define an inner, light reflecting surface 20 of the reflective wall.

The spherical reflector elements 16 are arranged in adjacent rows extending transversely to the top wall 3 and base 4. In FIG. 3, the centers of three rows of the reflector 10 are indicated by phantom lines designated by reference characters R1, R2, and R3. The spherical reflector elements in each row are staggered with respect to the spherical reflector elements in any adjacent row such that the center of each reflector element 16 in one row is located midway between the centers of adjacent pairs of spherical reflector elements in adjacent rows. Thus, with reference to FIG. 3, the center of the reflector element 16a in row R2 is located midway between the centers of the adjacent pairs of reflector elements 16b and 16c of row R1, as well as between the centers of the adjacent pairs of reflector elements 16d and 16e in the adjacent row R3.

Each of the spherical reflector elements 16 has the same diameter indicated at d in FIG. 2. The centers of adjacent pairs of reflector element 16 are separated a distance p (FIG. 2). In the illustrated embodiment, the distance p, or the pitch between the reflector elements is less than the diameter d of the reflector elements. Flat areas 22 parallel to the central plane 14 are formed on the surface of the reflective wall, the flat areas 22 each being enclosed by a group of three spherical reflector elements 16 as shown most clearly in FIGS. 10 and 11.

The inner, light reflecting surface 20 of the reflective wall 10 is coated with light reflective material 24. The coating can take place by vacuum metalizing the surface 20 with aluminum or the like in a manner well known in the art.

In the embodiment illustrated in FIGS. 1, 2 and 3, the thickness t (FIG. 2) between the flat areas 22 is one-half the diameter d of the reflector elements 16.

In FIG. 2, the line Hv is a line that lies in a horizontal and vertical plane, the vertical plane being parallel to the rows R1, R2 and R3 in FIG. 3. The central plane 14 extends at an acute angle z of 35° (FIG. 1) with respect to the base 4. Each of the reflector elements 16 has an operating arc w that extends entirely above the line Hv for each reflector element. In the embodiment of FIGS. 1 and 2, the effective reflecting height of the reflective wall 10 is indicated at h in FIG. 2. Each of the reflector elements 16 can reflect light striking the reflector outer surface within the arc w in both the horizontal and vertical planes. In FIG. 2, the operating arc w is approximately 110°.

The embodiment illustrated in FIG. 5 is identical to the embodiment of FIGS. 1, 2 and 3 except that the central plane of the reflective wall extends at an angle of 45° with respect to the base, or the horizontal. In FIG. 5, a reflector 10' is seated in the recess 12 of the housing 2 and has a central plane 14' on which the centers of the spherical reflector elements 16' are located. The greater angle of inclination of the central plane 14' as compared with the angle of inclination of the central plane 14 of the embodiment of FIGS. 1, 2 and 3 provides an effective reflective height h that is greater than the effective reflective height h of the previous embodiment. This is true even though there is one less row of reflective reflector elements 16' in the FIG. 5 embodiment than in the FIGS. 1–3 embodiment. The operating arc w in FIG. 5 extends below the line Hv an angle y, and above the line Hv an angle x. In the FIG. 5 embodiment, the operating arc w is approximately 105° and the angle y is approximately 10°. Thus, the reflector elements 16' in FIG. 5 can reflect incident light striking the reflector at an angle of 10° below the Hv line.

FIG. 10 embodiment is an enlarged fragmentary view of the reflector 10 of FIG. 2. Any incident light ray L striking the light receiving surface 18 along a radius of a spherical reflector element 16 will pass through the center C of the reflector element and will strike the inner, light reflecting surface 20 as indicated by the arrow 28 in FIG. 10. The light passing through the center C will be reflected along the same line as indicated by the arrow 30. Any light ray that enters the reflector element 16 along a path other than a radius will be refracted and will be reflected along a path non-parallel to the incident light.

The accumulation of dirt along the outer light receiving surface 18 of the reflector 10 will reduce the operating arc w of each reflector element 16. As dirt accumulates between adjacent pairs of the reflector elements as indicated by reference numeral 32 in FIG. 10, the operating arc w will be reduced to an operating arc w' of approximately 50°.

In a specific embodiment of a reflector according to the invention, the diameter d of the reflector elements may be 0.0722 inches, the pitch p between centers of adjacent pairs of reflector elements 16 may be 0.0625 inches, and the thickness t may be 0.0361 inches. The operating arc w, when the outer surface 18 is clean will be approximately 110°, while the operating arc w' when the surface 18 has accumulated dirt as indicated at 32, will be approximately 50°. The foregoing figures are given by way of example only and are not intended as a limitation.

FIGS. 7 through 9 illustrate sequential steps in the method of making the reflector 10. FIG. 6 illustrates a pin 36 used in the method of making the reflector 10. The pin 36 is of hexagonal cross-section having flat sides 38. The pin 36 is formed with a semi-spherical end 40, the center of the semi-spherical surface being indicated at 41. Each of the flat sides 38 has curved ends 42 at the semi-spherical end 40, the spherical surface of the pin end 40 being interrupted only by the curved end portions 42 of the sides 38. A portion 44 of peaked configuration is defined by the surface of the semi-spherical end 40 between adjacent pairs of the curved end portions 42.

A plurality of the pins 36 are assembled into a pin bundle 50 (FIG. 7), and an electroform 46 is formed by electroplating the semi-spherical ends 40 of the pin bundle 50 in a manner well known in the art. The electroform 46 has a mold surface 52 formed with semi-spherical depressions 48 that are complementary to the semi-spherical ends 40 of the pin bundle 50. The peak portions 44 of the pins 36 form peaks 56 on the surface of the electroform as shown in FIG. 8. The peaks 56 are removed by a grinding wheel 58 to form surfaces corresponding to the flat surfaces 22 of the reflector. After the peaks 56 are removed by the grinding wheel 58, two electroforms 46 are disposed in molding apparatus (FIG. 9) with the mold surfaces 52 thereof in opposed relationship with a cavity formed between the opposed mold surfaces 52. In FIG. 9, an electroform 46 is secured to an upper mold member 60, and an electroform 46 is secured to a lower mold member 62 in opposed relationship to the electroform carried by the upper mold members 60. The cavity defined between the opposed mold surfaces is filled with light transmitting synthetic resin to form the reflector 10, the portion of reflector 10 visible in FIG. 8 being a portion as viewed along section lines 4—4 in FIG. 3.

While the pins 36 are illustrated as being of hexagonal cross section, pins having other non-circular cross sections, such as square, may also be used to form a reflector according to the invention. The semi-spherical ends 40 can be machined with ease as compared to the extremely high accuracy required in machining three mutually perpendicular planes onto the ends of pins for forming cube corner reflectors.

While specific forms of the invention are illustrated in the accompanying drawings and described in the foregoing specification, it should be understood that the invention is not limited to the exact construction shown. Various alternatives in the construction and arrangement of parts, all falling within the scope and spirit of the invention, will be apparent to those skilled in the art.

The embodiments of the present invention in which an exclusive property or privilege is claimed are defined as follows:

1. A roadway marker comprising: a housing having a base for engagement with the surface of a roadway and a generally rectangular reflective wall for reflecting light from vehicles on the roadway; said reflective wall having a central plane extending at an acute angle from said base and being integrally formed with a plurality of spherical reflector elements arranged in side by side relationship, said spherical reflector elements each having its center located on said central plane with equal portions of said spherical reflector elements projecting from opposite sides of said central plane, said spherical reflector elements being arranged in adjacent horizontal rows extending parallel to the plane of said base with the spherical reflector elements in each row being staggered with respect to the spherical reflector elements in any adjacent row such that the center of each spherical reflector element in one row is located mid-way between the centers of adjacent pairs of spherical reflector elements in adjacent rows, the portions of the spherical reflector elements projecting from one side of said central plane defining an outer light receiving surface of said reflective wall and the portions of the spherical reflector elements projecting from the other side of said central plane defining an inner light reflecting surface of said reflective wall such that a light ray striking a reflector portion along a radius of a reflector element on said light receiving surface will pass through the center of said reflector element to the inner surface of the reflector portion of said reflector element in the light receiving surface and be reflected back through the center of said reflector element, the surface of said reflective wall being formed with flat areas parallel to said central plane, said flat areas each being enclosed by a group of three spherical reflector elements, the acute angle of said central plane with respect to said base being about 35°, and the distance between each adjacent pair of said spherical reflector elements being less than the respective diameters of the spherical reflector elements, each of said spherical reflector elements thereby having a reflective operating arc from its center of 110°.

2. A roadway marker as claimed in claim 1 including light reflecting material on said inner surface of said reflective wall.

3. A roadway marker as claimed in claim 2 wherein said light reflective material comprises a coating of metallic reflecting material.

4. A roadway marker as claimed in claim 1 wherein the diameter of said spherical reflector elements is twice the thickness between said flat areas.

5. A roadway marker as claimed in claim 1 wherein said reflective wall is formed integrally on an insert mounted in said housing, said housing having a recess formed therein, and said insert having a supporting flange depending from the periphery of said rows of reflecting elements and received in said cavity.

6. A roadway marker comprising: a housing having a base for engagement with the surface of a roadway and a generally rectangular reflective wall for reflecting light from vehicles on the roadway; said reflective wall having a central plane extending at an acute angle from said base and being integrally formed with a plurality of spherical reflector elements arranged in side by side relationship, said spherical reflector elements each having its center located on said central plane with equal portions of said spherical reflector elements projecting from opposite sides of said central plane, said spherical reflector elements being arranged in adjacent horizontal rows extending parallel to the plane of said base with the spherical reflector elements in each row being staggered with respect to the spherical reflector elements in any adjacent row such that the center of each spherical reflector element in one row is located mid-way between the centers of adjacent pairs of spherical reflector elements in adjacent rows, the portions of the spherical reflector elements projecting from one side of said central plane defining an outer light receiving surface of said reflective wall and the portions of the spherical reflector elements projecting from the other side of said central plane defining an inner light reflecting surface of said reflective wall such that a light ray striking a reflector portion along a radius of a reflector element on said light receiving surface will pass through the center of said reflector element to the inner surface of the reflector portion of said reflector element in the light receiving surface and be reflected back through the center of said reflector element, the surface of said reflective wall being formed with flat areas parallel to said central plane, said flat areas each being enclosed by a group of three spherical reflector elements, the acute angle of said central plane with respect to said base being about 45°, and the distance between each adjacent pair of said spherical reflector elements being less than the respective diameters of the spherical reflector elements, each of said spherical reflector elements thereby having a reflective operating arc from its center about 105°.

7. A roadway marker as claimed in claim 6 including light reflecting material on said inner surface of said reflective wall.

8. A roadway marker as claimed in claim 7 wherein said light reflective material comprises a coating of metallic reflecting material.

9. A roadway marker as claimed in claim 7 wherein said reflective wall is formed integrally on an insert mounted in said housing, said housing having a recess formed therein, and said insert having a supporting flange depending from the periphery of said rows of reflecting elements and received in said cavity.

* * * * *